United States Patent [19]

Brandt

[11] Patent Number: 5,584,318

[45] Date of Patent: Dec. 17, 1996

[54] MODULAR FUEL FILTER AND PRESSURE REGULATOR APPARATUS

[75] Inventor: Timothy B. Brandt, Des Moines, Iowa

[73] Assignee: Parr Manufacturing, Inc., Des Moines, Iowa

[21] Appl. No.: 319,943

[22] Filed: Oct. 7, 1994

[51] Int. Cl.⁶ ............................. G05D 5/00; B01D 27/10
[52] U.S. Cl. ..................... 137/549; 210/130; 210/137; 210/433.1
[58] Field of Search ........................... 137/549, 565; 210/130, 137, 433.1

[56] References Cited

U.S. PATENT DOCUMENTS

| | | | |
|---|---|---|---|
| 3,061,101 | 10/1962 | Humbert | 210/130 |
| 3,599,792 | 8/1971 | Stripp | 210/130 |
| 5,078,167 | 1/1992 | Brandt et al. | |
| 5,389,246 | 2/1995 | Zinga | 210/130 |
| 5,390,701 | 2/1995 | Lessley et al. | 137/549 |
| 5,402,817 | 4/1995 | Bueser | 137/549 X |
| 5,433,241 | 7/1995 | Robinson | 137/549 X |
| 5,458,767 | 10/1995 | Stone | 210/130 X |
| 5,462,658 | 10/1995 | Sem | 210/433.1 X |

*Primary Examiner*—Hoang Nguyen
*Attorney, Agent, or Firm*—Henderson & Sturm

[57] ABSTRACT

A combination fuel pressure regulator and fuel filter apparatus for vehicle fuel systems wherein the pressure regulator telescopes into the fuel filter and wherein the two parts are separable and independently replaceable. The fuel filter is operably disposed between an inlet supply tube and an outlet tube for filtering impurities from fuel passing therethrough. A valve in fluid communication with the inlet tube is provided with a regulator for causing flow to be short circuited back into the fuel supply tank when the pressure in the fuel outlet exceeds a predetermined level. The valve is biased to a closed position and will remain closed when the pressure on the clean side of the filter is below the predetermined pressure whereby all of the fuel in the inlet tube will pass through the filter when the pressure in the fluid outlet is below the predetermined pressure.

7 Claims, 4 Drawing Sheets

MODULAR FUEL FILTER AND PRESSURE REGULATOR APPARATUS

TECHNICAL FIELD

The present invention relates to a vehicle fuel supply system and more particularly to a fuel filter and fuel regulator system which not only regulates the fuel on the dirty side of the filter in response to the pressure on the clean side of the filter but is also modular so that either the filter element or the regulator can be separately replaced as needed without replacing the entire unit.

BACKGROUND ART

U.S. Pat. No. 5,078,167 to Brandt et al discloses a fuel filter and pressure regulator system which has been well accepted by the automotive industry. One of the disadvantages with such a device however is that if the filter becomes clogged, the entire unit including the pressure regulator portion needs to be replaced and likewise if for some reason the pressure regulator were to malfunction, the whole unit, including the filter, needs to be replaced. Consequently, there is a need for a device like that shown in U.S. Pat. No. 5,078,167 which is modular so that the filter unit and regulator unit can be separately and independently replaced without replacing the other one thereof. It is however still desirable to have the units together on top of the fuel tank of a vehicle and consequently there has existed a need to solve the problem of how this should be done.

DISCLOSURE OF THE INVENTION

The present invention relates to a combination fuel pressure regulator and fuel filter apparatus for vehicle fuel systems wherein the pressure regulator telescopes into the fuel filter and wherein the two parts are separable and independently replaceable. The fuel filter is operably disposed between an inlet supply tube and an outlet tube for filtering impurities from fuel passing therethrough. A valve in fluid communication with the inlet tube is provided with a regulator for causing flow to be short circuited back into the fuel supply tank when the pressure in the fuel outlet exceeds a predetermined level. The valve is biased to a closed position and will remain closed when the pressure on the clean side of the filter is below the predetermined pressure whereby all of the fuel in the inlet tube will pass through the filter when the pressure i in the fluid outlet is below the predetermined pressure.

An object of the present invention is to provide a combination filter and regulator having a changeable filter element and a modular regulator cartridge.

Another object of the present invention is to provide a simple and inexpensive way to change the filter on the aforementioned type of device.

A further object of the present invention is to provide fluid flow between a fluid regulator and a modular filter element without providing additional tubes or the like connecting them together.

A further object of the present invention is to provide a debris screen for protecting the regulator from pump debris and for protecting the regulator when the filter element is being changed so that foreign objects do not drop down on the valve seat which would interfere with the operation of the pressure regulator.

A still further object of the present invention is to provide an O-ring arrangement wherein the top ring is fluorocarbon and the bottom ring is fluorosilicon for low temperatures.

A still further object of the present invention is to provide increased flexibility for use operation and repair of a combination filter and fuel regulator for engines such as those used in vehicles.

Another object of the present invention is to make a combination fuel filter and regulator which requires a minimal labor cost to change out either part.

Other objects, advantages, and novel features of the present invention will become apparent from the following detailed description of the invention when considered in conjunction with the accompanying drawings.

BEST MODE FOR CARRYING OUT THE INVENTION

Figure 1:
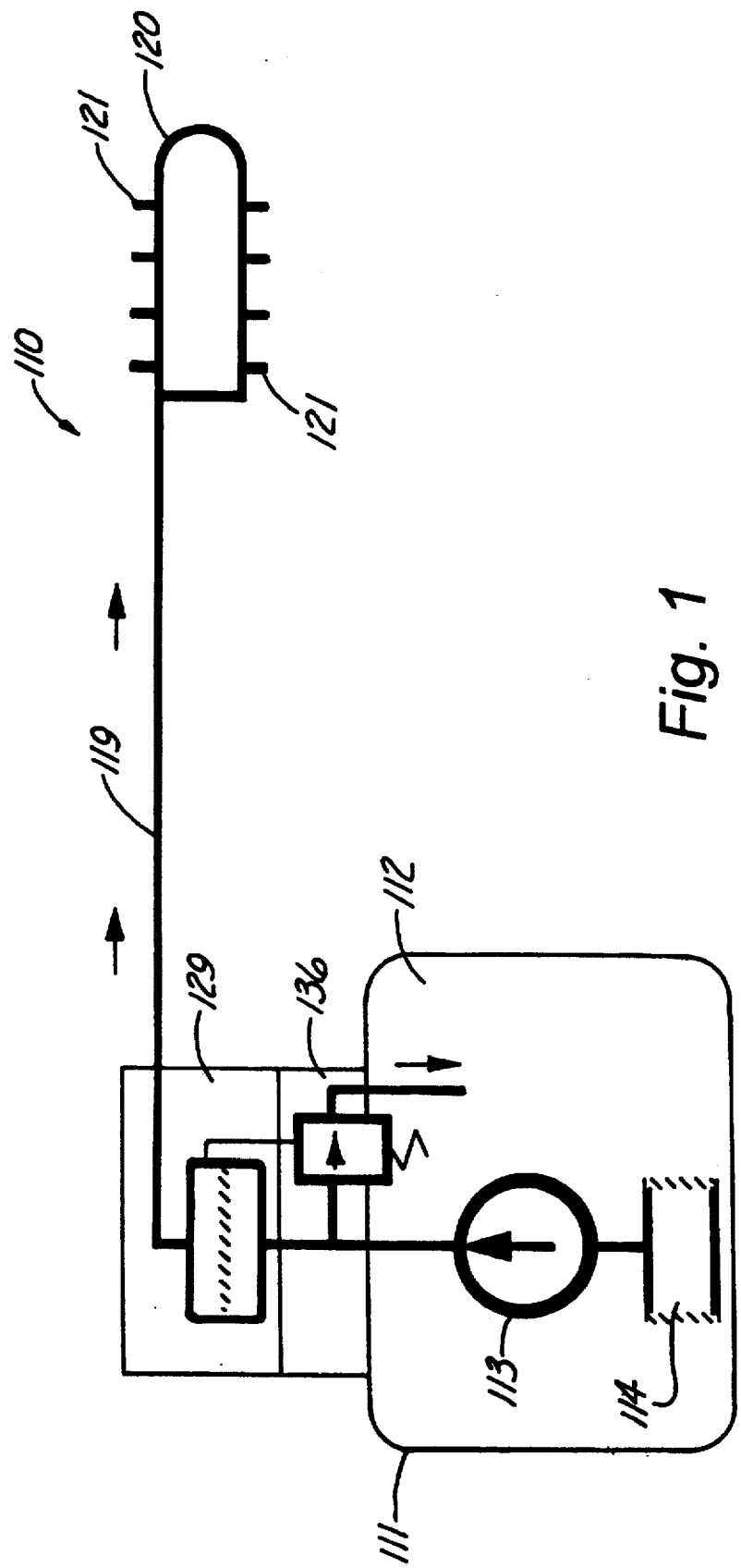
FIG. 1 is a schematic view of a fuel supply system constructed in accordance with the present invention.

Referring now to the drawings wherein like reference numerals designate identical or corresponding parts throughout he several views, FIG. 1 shows a fuel supply system (110) constructed in accordance with the present invention and having a fuel tank (111) with liquid fuel (112) disposed therein. Fuel pump (113) which is preferably electrically operated, constantly draws fuel from an inlet port (114) and delivers it through an outlet port to a fuel pump supply port (141) of a combination fuel filter and fuel regulator (100). An outlet supply tube (118) of the combination filter and pressure regulator (136) is connected to a line (119) leading to a fuel supply rail (120) having a plurality of fuel injectors (121) attached thereto for supplying fuel to an engine.

Figure 3:
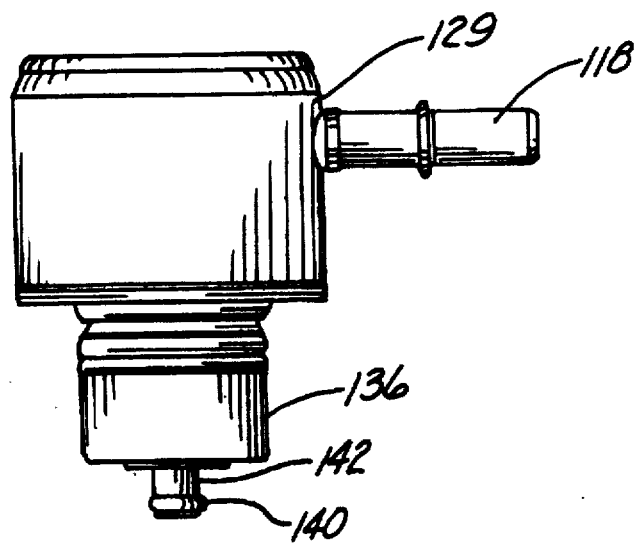
FIG. 3 is a side elevational view of the two housing modules together in the position of use.
Figure 4:
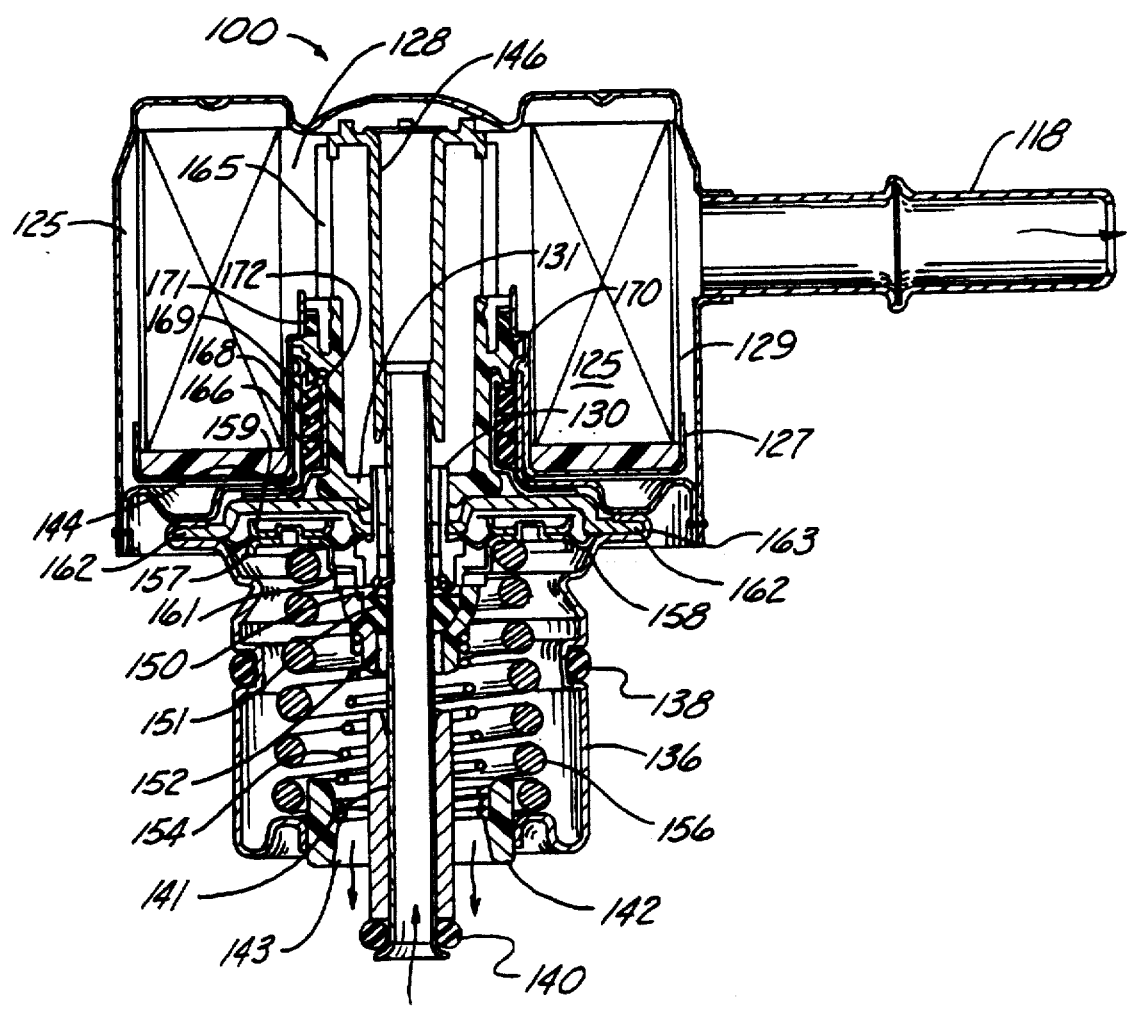
FIG. 4 is an enlarged cross sectional view showing one of the present invention in a mode where the pressure in the outlet of the device is low enough that a coaxial dump valve is closed so that all of the fuel is passing through the fuel filter and is being directed to the fuel supply rail.

FIG. 4 shows filter/regulator (100) which works essentially like the FIG. 6 and 8 embodiment of U.S. Pat. No. 5,078,167 to Brandt, which patent is incorporated herein by reference. In fact most of the numbers on FIGS. 1–4 of this specification correspond to corresponding parts in U.S. Pat. No. 5,078,167.

A filter (125) is held in place inside housing (129). Valve tube (130) is also clamped in place by member (131). Annular flange (136) has an annular groove for holding O-ring (138) and seals an opening into the top of the fuel tank (111). A large diaphragm biasing spring (156) biases the diaphragm (158) and corresponding rigid annular member (157) and (159) upwardly. Annular members (162) and (163) clamp the outer edges of the diaphragm (158) and the inner edge of the diaphragm is sealingly held between members (162) and flange (164) onto valve tube (130). The top of a tube (141) is held coaxial with the axis of tube (130) by upper tube (146). The bottom of the tube (141) extends into an opening (140) of fuel pump supply tube (142).

A diaphragm biasing spring (156) is much larger than a smaller valve seat biasing spring (154). The bottom of the spring (154) is in abutment with the top of member (142) and the biasing spring (154) pushes upwardly on member (152) which has an upper convex spherical surface for matingly receiving the lower partially spherical surface of member (151). An elastomeric valve seat (150) fits in a groove in the top of member (151) and the entire assembly, including valve seat (150), and member (151) and (152) are biased upwardly toward valving surface (153) by the spring (154).

In operation of the embodiment (100), initially the diaphragm biasing spring (156) will push the diaphragm (158) upwardly until member (159) abuts the top member (162). This will prevent the diaphragm from being damaged which it might be if it was not otherwise limited in its upward travel. In the upper position shown in FIG. 4, push member (161) is elevated enough so that the spring (154) can push ultimately the elastomeric valve seat (150) against the annular valving surface (153) of the valve tube (130), thereby causing all of the flow through fuel pump supply tube (141) and valve tube (130) to pass into the filter chamber and be forced out through the filter (125) to fluid outlet (118).

When the pressure on the clean side of the filter (125), for example at fluid outlet (118), becomes higher than the predetermined pressure desires, the excess pressure will push the diaphragm (158) downwardly as shown by the pressure extending through opening (144) in member (162). This will cause annular flange (161) to push downwardly on the top of member (152) and cause the spring (154) to compress. This condition allows the pressure of the fuel in tube (130) to force its way past members (146), between valving surface (153) and (150) and be short circuited back through the lower housing (135) through slots (155) in member (152) and then eventually fall through openings (143) which lead back to the fuel tank (111) shown in FIG. 1.

It will be understood of course that as the pressure on the clean side of the filter (125) fluctuates so will the relative position of the diaphragm (158) and consequently of the distance between the elastomeric seat (150) and valving surface (153) so that metering of the flow returning to the fuel tank occurs. Of course as the pressure on the downstream side of the filter (125) drops, for example because of consumption of fuel by the engine (22), the diaphragm will move upwardly, thereby allowing the valve seat (150) to move upwardly to eventually move to the closed position shown, whereby all of the flow will go through the filter (125) until such time as conditions change. It is significant to note that the seal (150) is guided on the interior surface thereof as it moves up and down on tube (141) respectively.

As the fluid passes into fuel supply tube (141), it will pass through the pump debris screen (165) to filter out larger particles and to prevent foreign objects or particles from falling down onto seat washer (150) during the change of the filter housing (129). This is important because even a very small particle could cause the pressure regulator to malfunction.

After the fuel passes through fuel supply tube (141), it will then encounter the filter (125) but will essentially remain unfiltered in the chamber (128). Assuming the pressure at (128) exceeds the pressure in outlet (118), the pressure will flow through the filter media (125) and out the fuel supply tube (118) to supply the fuel rail with fuel for the engine. In order to maintain the proper pressure at the fuel rail, the diaphragm (158) is subjected to essentially the same pressure as the pressure in the outlet tube (118).

This flow to the top side of the diaphragm (158) passes on the outside of low temperature O-ring (166) and bottom ring (167). The flow continues up past spacer (168) and to the left of pressure O-ring (169) to the screen retainer cup (170). The fluid between dirt seal ring (171) and pressure seal O-ring (169) is essentially in an annular passageway and can pass down through an opening in member (131) for example as shown by dashed line (172) on the left side of member (131) as shown in FIG. 4. This allows the flow of fluid which is at the pressure of outlet supply tube (118) to pass down through opening (144) in member (162) and ultimately fill the chamber above diaphragm (158) with fluid at the same pressure as the pressure at outlet (118). The O-ring (166) is made of a fluorosilicon for low temperatures and the upper pressure seal O-ring (169) is constructed of a fluorocarbon material.

Figure 2:
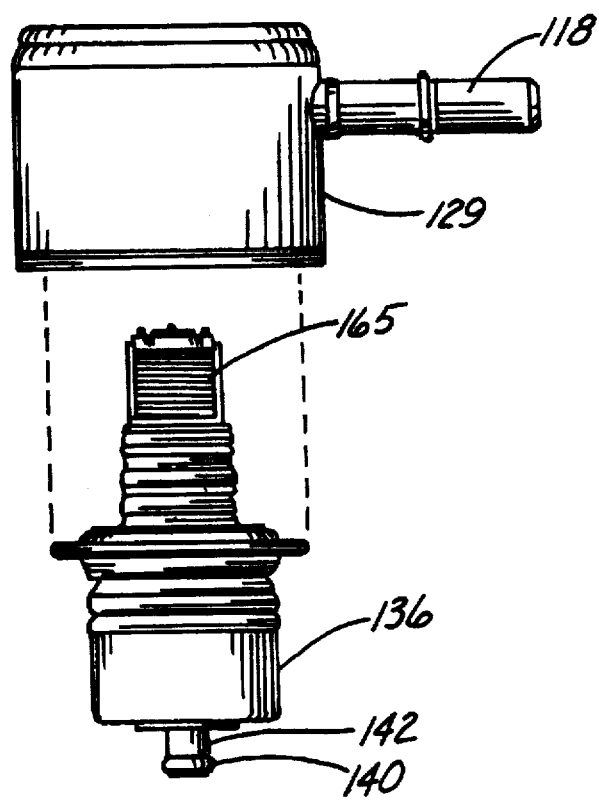
FIG. 2 is a side elevational exploded view of the two housing modules of FIG. 1 separated.

Referring to FIGS. 2 and 3, it is noted that the regulator cartridge (136) and fuel filter housing module (129) can be held together in one of several ways. One such way is to utilize a rotary-type of locking system which is not shown in the drawings. Another way to hold the two parts together is to merely use a strap to hold the two pieces together or for example just a strap that goes around both sections so that they cannot be separated without removing the strap therefrom. There are of course many other ways to hold these two modular parts (129) and (136) together.

Figure 5:
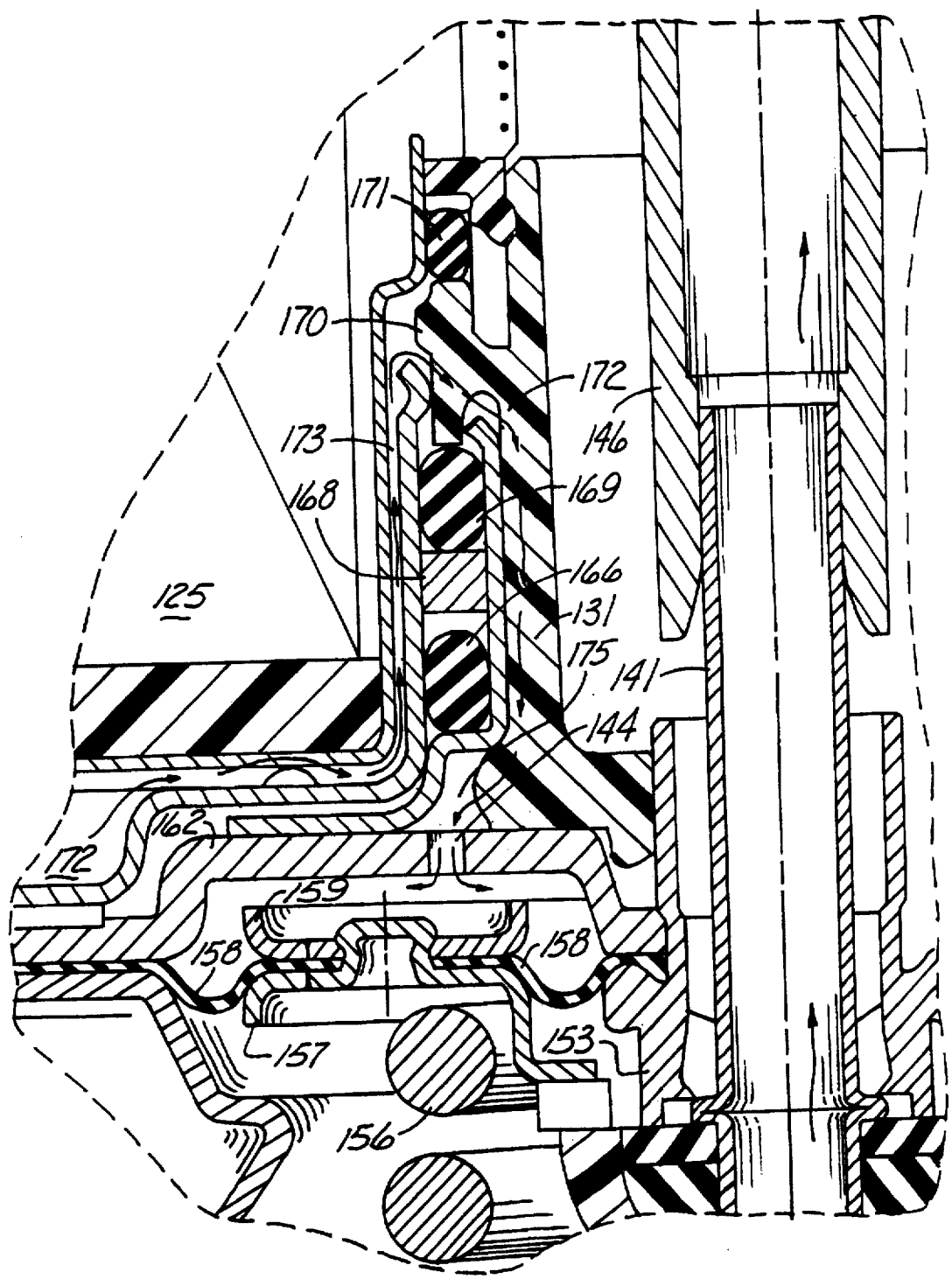
FIG. 5 is an enlarged view of the telescoping portion of FIG. 4 which shows the flow of material between the filter module and the regulator module.

FIG. 5 is an enlarged view to show how the flow from outlet tube (118) extends to around the outside of the filter media (125) and ultimately to the annular space (172) below the filter media and then through the path (173). The direction arrows extend upwardly to retainer screen cup (170) and then downwardly through a slot shown by dashed line (172) to a space (175) and then through opening (144) in member (162) so that the space above diaphragm (158) is essentially at the same pressure as outlet tube (118).

Accordingly it will be appreciated that the preferred embodiment shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A combination fuel pressure regulator and fuel filter apparatus for vehicle fuel systems comprising:

a first housing module operably attached to a vehicle fuel supply tank;

a second housing module;

attachment means for operably attaching or detaching said second housing module to said first housing module whereby one of said housing modules can be replaced without replacing the other of said modules, said attachment means including a first portion on one of said housing modules telescopingly sealing into a first opening in said second housing module and having spaced apart O-ring seals disposed on said first portion for providing a fluid path therebetween while still permitting a twist mount locking mechanism to be used if desired;

an inlet supply tube operably attached to said first housing module adapted to be in fluid communication with a fuel supply rail;

a fuel filter means disposed within said second housing module and disposed between said inlet supply tube and said fluid outlet for filtering impurities from substantially all of the fuel passing to said outlet;

valve means disposed in said first housing module and being in fluid communication with said inlet supply tube for causing flow to be short circuited back into said fuel supply tank when the pressure in said fluid outlet exceeds a predetermined level; and valve biasing means disposed in said first housing module for biasing said valve means closed when said pressure is below said predetermined pressure whereby all of the fuel in said inlet supply tube will pass through said filter when the pressure in said fluid outlet is below said predetermined pressure.

2. The apparatus of claim 1 including a screen disposed between said fuel filter means and said valve means for preventing foreign particles from interfering with the sealing action of said valve means.

3. The apparatus of claim 1 wherein one of said O-rings is constructed of a fluorocarbon material.

4. The apparatus of claim 3 wherein another O-ring is constructed of fluorosilicon for withstanding low temperatures.

5. Vehicle fuel system comprising:
   a fuel supply tank;
   a fuel supply rail;
   a fuel pump;
   a first housing module operably attached to said fuel supply tank;
   a second housing module;
   means for operably attaching or detaching said second housing module to said first housing module whereby one of said housing modules can be replaced without replacing the other of said housing modules;
   an inlet supply tube attached to said first housing module and being in fluid communication with said fuel supply rail;
   a fuel filter means disposed within said second housing module and disposed between said inlet supply tube and said fluid outlet for filtering impurities from substantially all of the fuel passing to said outlet;
   valve means in fluid communication with said inlet supply tube for causing flow to be short circuited back into said fuel supply tank before it passes through said fuel filter means when the pressure in said fluid outlet exceeds a predetermined level;
   valve biasing means disposed in said first housing module for biasing said vale closed when said pressure is below said predetermined pressure whereby all of the fuel in said inlet supply tube will pass through said filter when the pressure in said fluid outlet is below said predetermined pressure; and
   screening means disposed between said fuel filter means and said valve means for screening flow therethrough essentially only when the valve means is open to allow flow to be short circuited back to said supply tank thereby preventing foreign particles from interfering with the sealing action.

6. A combination fuel pressure regulator and fuel filter apparatus for vehicle fuel systems comprising:
   a fuel supply tank;
   a fuel supply rail adapted to have fuel injectors attached thereto;
   a fuel pump means having an inlet port and an outlet port for pumping fuel to said fuel supply rail;
   a first housing module having an inlet supply tube in fluid communication with said fuel pump means outlet port;
   a second housing module having a fluid outlet in fluid communication with said fuel supply rail;
   a fuel filter means disposed in said second housing module and being operatively disposed between said inlet supply tube and said fluid outlet for filtering impurities from substantially all of the fuel passing to said outlet;
   valve mean disposed in said first housing module and being in fluid communication with said inlet supply tube for causing flow to be short circuited back into said fuel supply tank when the pressure in said fluid outlet exceeds a predetermined level;
   valve biasing means disposed in said first housing module for biasing said valve means closed when said pressure is below said predetermined pressure whereby all of the fuel in said inlet supply tube will pass through said filter when the pressure in said fluid outlet is below said predetermined pressure; and
   attachment means for operably attaching or detaching said second housing module to said first housing module whereby one of said housing modules can be replaced without replacing the other of said housing modules, said attachment means including a first portion on one of said housing modules telescopingly sealing into a first opening in said second housing module and having spaced apart O-ring seals disposed on said first portion for providing a fluid path therebetween while still permitting a twist mount locking mechanism to be used if desired.

7. A combination fuel pressure regulator and fuel filter apparatus for vehicle fuel systems comprising:
   a first housing module operably attached to a vehicle fuel supply tank;
   a second housing module;
   attachment means for operably attaching or detaching said second housing module to said first housing module whereby one of said housing modules can be replaced without replacing the other of said modules;
   an inlet supply tube operably attached to said first housing module adapted to be in fluid communication with a fuel supply rail;
   a fuel filter means disposed within said second housing module and disposed between said inlet supply tube and said fluid outlet for filtering impurities from substantially all of the fuel passing to said outlet;
   valve means disposed in said first housing module and being in fluid communication with said inlet supply tube for causing flow to be short circuited back into said fuel supply tank when the pressure in said fluid outlet exceeds a predetermined level;
   valve biasing means disposed in said first housing module for biasing said valve means closed when said pressure is below said predetermined pressure whereby all of the fuel in said inlet supply tube will pass through said filter when the pressure in said fluid outlet is below said predetermined pressure; and
   screening means disposed between said fuel filter means and said valve means for screening flow therethrough essentially only when the valve means is open to allow flow to be short circuited back to said supply tank thereby preventing foreign particles from interfering with the sealing action.

* * * * *